(12) United States Patent
Drechsel (10) Patent No.: US 8,352,090 B2
(45) Date of Patent: Jan. 8, 2013

(54) METHOD FOR OPTIMIZING THE DESIGN OF AN IRRIGATION PLANT AND APPARATUS FOR IMPLEMENTING SUCH METHOD

(75) Inventor: Arno Drechsel, Lienz (AT)

(73) Assignee: IWT Innovative Water Technologies, Lienz (AT)

( * ) Notice: Subject to any disclaimer, the term of this patent is extended or adjusted under 35 U.S.C. 154(b) by 231 days.

(21) Appl. No.: 12/741,025

(22) PCT Filed: Nov. 14, 2008

(86) PCT No.: PCT/IB2008/054784
§ 371 (c)(1),
(2), (4) Date: Apr. 30, 2010

(87) PCT Pub. No.: WO2009/063430
PCT Pub. Date: May 22, 2009

(65) Prior Publication Data
US 2010/0268362 A1   Oct. 21, 2010

(30) Foreign Application Priority Data
Nov. 14, 2007   (IT) .................. VI2007A0297

(51) Int. Cl.
*G06F 19/00* (2011.01)
(52) U.S. Cl. ....................... 700/284; 239/723
(58) Field of Classification Search ........... 239/723; 700/284
See application file for complete search history.

(56) References Cited

U.S. PATENT DOCUMENTS

| 6,267,298 | B1 | 7/2001 | Campbell |
| 7,051,952 | B2* | 5/2006 | Drechsel .................. 239/256 |
| 2002/0066810 | A1* | 6/2002 | Prandi ..................... 239/728 |
| 2004/0089735 | A1* | 5/2004 | Drechsel .................. 239/195 |

OTHER PUBLICATIONS

"WaterMark Pro: Irrigation Design System for Sprinker Contractors", printed from http://www.sciencehill.net/features.htm through archive.org as of Oct. 30, 2007.*
Anonymous, WeterMark Pro Features and Benefits, Internet Article, Oct. 30, 2007, retrieved on May 7, 2009 at http://web.archive.org/web/20071030005350/http://www.sciencehill.net/features.htm.
Hutchinson Graham et al., IRRICAD—computerized irrigation design, Management of Irrigation and Drainage Systems: Integrated Perspectives, 1993, pp. 835-841, XP009116573, ASCE (Abstract; pp. 836-837).

(Continued)

*Primary Examiner* — Michael D Masinick
(74) *Attorney, Agent, or Firm* — Themis Law (57) ABSTRACT

The present invention relates to a method for optimized design of an irrigation system with tubing spans equipped with components including distributors, each composed of elements. The method comprises the steps of: inputting first data about spans into storage means of a computer apparatus where an IT product for designing the plant is stored, which comprises a database of the elements; inputting second data concerning the terminals of the last spans into the storage means; selecting elements from a group of sets of elements contained in the database; and generating, by the IT product, a list of components comprising the selected elements. Each of the sets is processed by the IT product by selecting, of all the available elements, those having mechanical properties suitable for the first and second input data and the previously selected elements for mechanical continuity of the irrigation plant.

21 Claims, 4 Drawing Sheets

OTHER PUBLICATIONS

De Andrade C D L T et al., SPRINKMOD—simulation of pressure and discharge distributions in pressurized irrigation systems: graphical interface and strategy of design, Proceedings of the 7th internationla conference on computers in agriculture, 1998, pp. 167-175, XP009116571, Am. Soc. Agr. Eng. St. Joseph, Mi, Isbn: 0-929355-99-7 (Abstract,; p. 172).

PCT, International Search Report.

* cited by examiner

METHOD FOR OPTIMIZING THE DESIGN OF AN IRRIGATION PLANT AND APPARATUS FOR IMPLEMENTING SUCH METHOD

FIELD OF INVENTION

The present invention relates to a method for irrigation system design.

Particularly, the present invention relates to a method allowing optimization of such design with the purpose of receiving assistance in generating a list of system components.

The present invention also relates to a computer apparatus for optimized design of an irrigation system, which implements the above method.

BACKGROUND OF THE INVENTION

Irrigation systems are known to be used in agriculture for watering crops. Some of the prior art systems are designed to draw water from a source and to sprinkle it over the soil through one or more distributor means.

In the case of large crops, irrigation systems are of adequate size, and generally consists of pivot or linear type systems.

Figure 1:
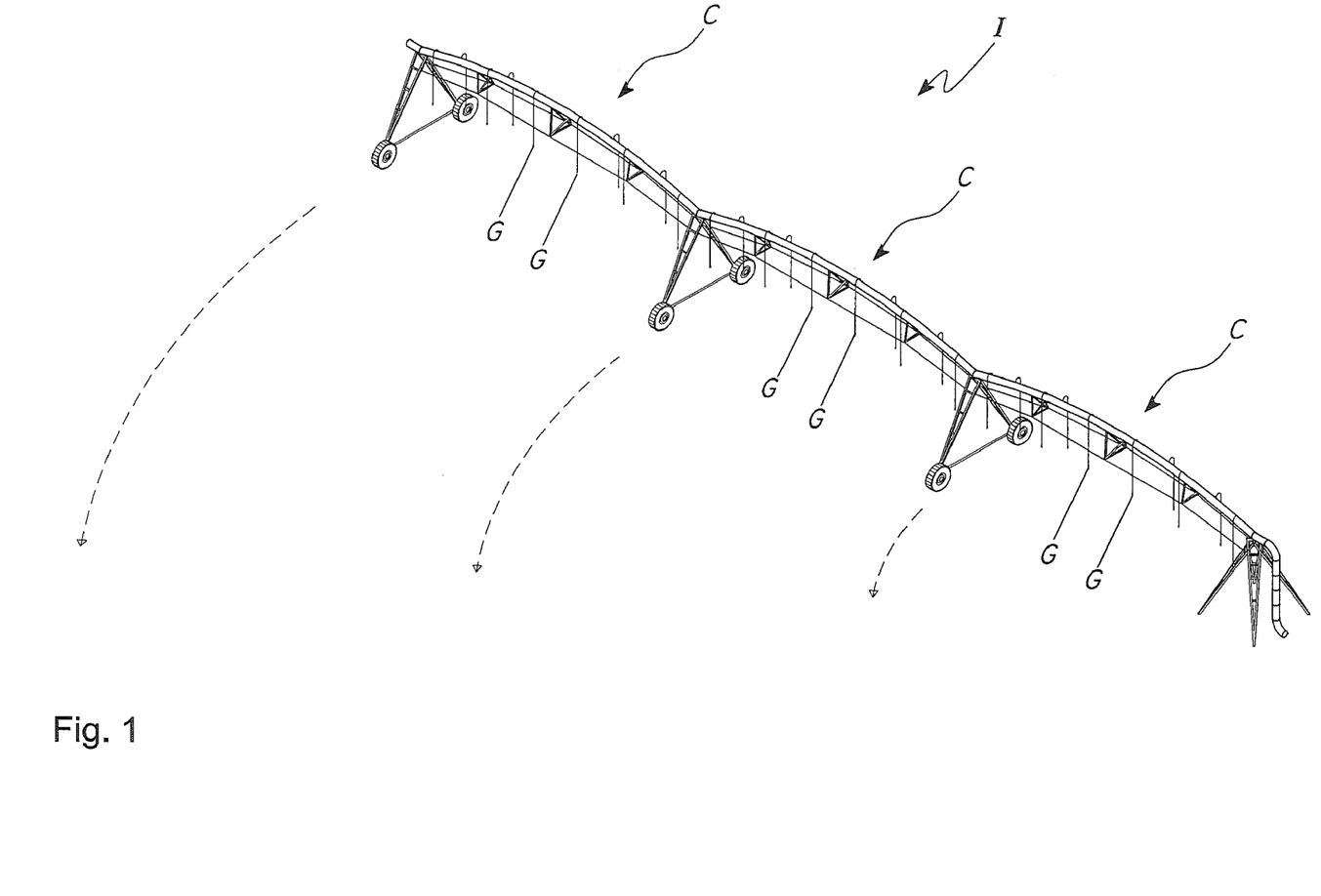
FIG. 1 shows an irrigation system suitable to be designed by the apparatus of the invention, using the method of the invention.

More in detail, as shown in FIG. 1 which illustrates an irrigation system I, they are composed of a plurality of tubing spans C operatively arranged in series, the first of which is connected to the water source for drawing water from it, and the latter may have means for propelling and distributing water, not shown, which generally consist of a gun sprinkler which sprinkles water over the soil with the aid of a booster pump. Each span C further has one or more distributors G, i.e. means for sprinkling water over the underlying soil.

While the system of the figure is of pivot type, reference shall be obviously made herein to irrigation systems in general, also including linear type systems.

Figure 2:
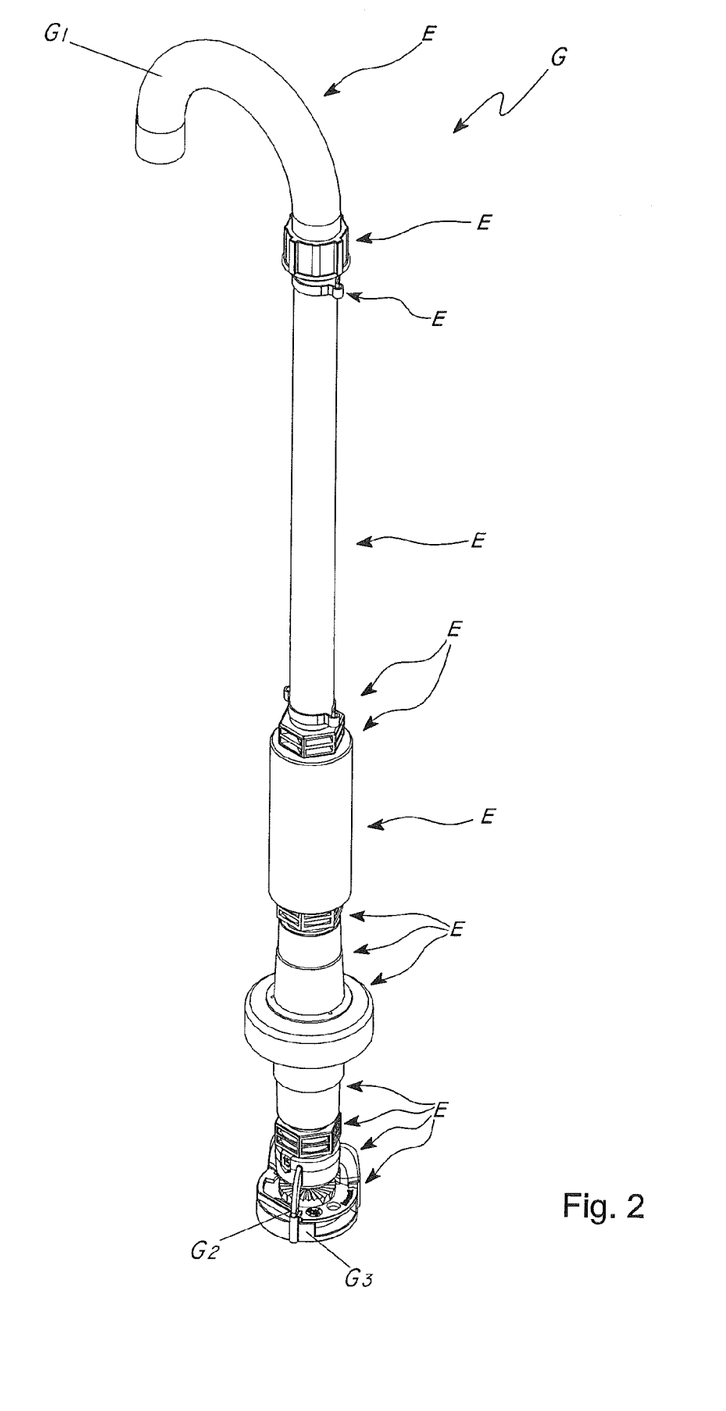
FIG. 2 is an axonometric view of a detail of FIG. 1.

One example of the above mentioned distributors G is shown in FIG. 2. Here, a distributor G appears to be composed of a plurality of elements E, the first being a fitting G1 for connection to the span C, and the latter being a nozzle G2 for sprinkling water to the soil. A deflector disk G3 is provided in addition to the nozzle G2 for shaping the water sprinkling pattern.

Apparently, a critical aspect of these irrigation systems is the selection of components, during design, to ensure sufficient water pressure in every part of the system, as well as optimal water sprinkling over the soil. Design complexity is increased if the system is not uniform, and has to be adapted to irrigation of different crops and/or to soils having different characteristics.

Thus, systems may be differentiated based on the height from the soil, due to the different crop types for which they are designed, and on special hydraulic requirements they have to meet, as dictated by the available water amount and pressure and by agronomic conditions.

As a result, many different components, especially distributors, may be used for these systems, and in many configurations.

Figure 3:
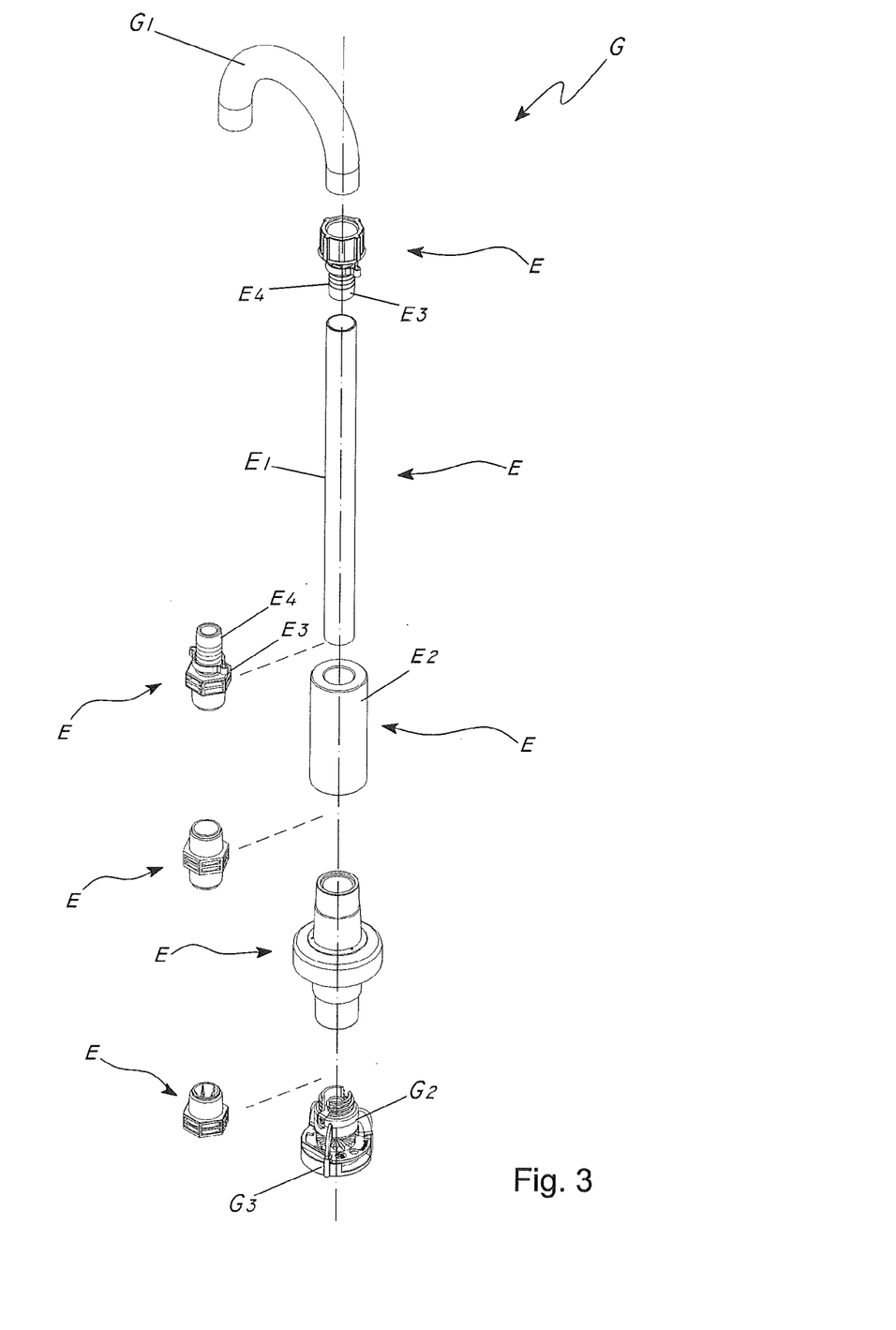
FIG. 3 is an axonometric exploded view of the detail of FIG. 2.

The spans are generally differentiated by length, by the number of distributors they contain, by the water flow rate, by the height from the soil, by the drive means associated therewith. A much larger number of variants, as shown in the exploded view in FIG. 3, are associated with the elements E that may be used to compose the distributors G in view of ensuring optimized water sprinkling to the underlying crops.

Therefore, the design step in which the components of the irrigation system are selected is critical, particularly concerning the selection of the distributor elements. Due to their wide variety, resulting from the many forms they have taken in the art, not all the available elements are compatible with each other.

Also, according to water availability, the right pressure has to be ensured throughout the system. Thus, it may happen that a part of the design has to be changed while in progress as a result of unsatisfactory results in computing water distribution coefficients.

In one prior art technique, the design process is generally carried out by technical experts, who select the system components from a plurality of lists of available components. Apparently, these selections fully depend on technicians' skills.

More in detail, technicians generally first select the number and type of spans and the number of distributors to be provided therein. Also, when appropriate, they select the type of terminal element, such as a gun. Then, technicians select the elements that compose each distributor.

This design method appears to suffer from certain well-recognized drawbacks.

One of these drawbacks is that the lists of components are very long and much expertise is required of the technicians, to avoid any composition errors, especially concerning the distribution elements. Indeed, as mentioned above, the mechanical characteristics of these elements may prevent them from being successfully coupled together. For instance, tubular conduits may be formed of different materials, and have to be connected by connection means suitable for the selected materials.

Another example is that the elements may be equipped with male or female connectors at their ends, wherefore they cannot be connected together in random combinations.

Therefore, it will be understood that one error in the selection of one or more elements may affect not only proper water sprinkling over the crops, but also the mechanical continuity of the system, i.e. the possibility of assembling the system.

This problem is increased by the size of the irrigation system. Irrigation systems for large lands, possibly requiring different water flows, are very large and particularly complex. Here there is a considerably increased error probability in the selection of elements.

It shall be further noted that, after design, a check has to be made as to whether water pressures and water distribution coefficients throughout the system are correct. This involves the additional drawback that, in case of unsatisfactory results, the previous selections have to be changed, thereby increasing the complexity of the method and particularly error probability.

Computer assisted design products are known, which are adapted to be installed in computer memories for implementing design methods that might assist the technician's work.

All of these methods have in common a first step in which the technician has to select the components, and particularly the distributor elements, from a list of all commercially available components and a second step in which the IT product is run to process water distribution coefficient computing.

Apparently, this method is not significantly different from the one described above, and retains all of its drawbacks.

Particularly, the risk still exists that the selection of elements does not ensure the mechanical continuity of the system.

Furthermore, the design process has to be carried out by technical experts, having sufficient skills to determine the most appropriate elements among those available, to prevent an error probability from becoming a certitude.

SUMMARY OF THE INVENTION

The object of the present invention is to overcome the above prior art drawbacks.

Particularly, a main object of the present invention is to provide a method for optimized design of an irrigation system providing lower error probability in the selection of system components, particularly in the selection of distributor elements.

Another particular object is to provide a system for optimizing the design of an irrigation system that allows such design to be possibly carried out by non expert personnel, while maintaining a minimized error probability in component selections.

A further object of the present invention is to speed up such design process while maintaining a minimized error probability in component selections.

Yet another object of the invention is to provide a computer apparatus for optimized design of an irrigation system providing lower error probability in the selection of components of the system, so that the design process may be also carried out by non expert personnel.

These and other objects, as better explained hereafter, are fulfilled by a method for optimized design of an irrigation system as defined in one aspect of the invention.

Particularly, this method for optimizing the design of an irrigation system, which includes one or more tubing spans provided with a plurality of components comprising distributors, each of said distributors including one or more elements, comprises the following steps:

providing first data concerning said spans and loading them into storage means of a computer apparatus in which a computer program product is installed for designing said system, said computer program product comprising a database of said components and said elements;

providing second data concerning the terminals of the last of said spans and loading them into said storage means;

selecting one or more elements of said distributors from a group of sets of said elements contained in said database loaded in said computer program product;

generating at least one partial list of said components including at least said selected elements using said computer program product, wherein each of said sets of said group is processed by said computer program product by selecting, among all the available elements, those having mechanical properties compatible with at least said first and said second input data and said elements which have been previously selected among one or more of said sets to ensure the mechanical continuity of said irrigation system during assembly thereof.

Conveniently, the provision of processing sets of elements by selecting, among all available elements, those having mechanical properties suitable for the input data and the previously selected elements, allows the selection of elements by the designer to ensure at least mechanical continuity of the irrigation system during assembly.

In one aspect of the invention, the II product comprises a subproducts for computing water distribution coefficients in the irrigation system, to ensure one or more desired hydraulic parameters during operation of the system.

For such subproduct to be executed, third data about the amount of available water and fourth data about water pressure in at least one location of the system are input into the storage means, generally before the first input data.

Therefore, the processing of sets according to the method of the invention may conveniently ensure the maintenance of minimum hydraulic parameters for proper operation of the irrigation system.

In another aspect of the invention, the computer subproduct also uses data loaded in the IT product concerning the hydraulic parameters of water deflector disks, to ensure that water distribution coefficient calculations are correct.

In other words, the method of the invention advantageously minimizes the probability that the designed system will have assembly problems or insufficient water distribution coefficients for its operation.

Furthermore, the zero error probability in element selection advantageously allows the system to be designed even by non particularly skilled personnel.

Also, since the subprogram for computing water distribution coefficients relies on data concerning the hydraulic parameters of water deflector disks, its calculations are particularly precise.

Conversely, water distribution coefficient computing by commercially available IT products does not account for such disks and provides more approximate results.

In another aspect of the invention, the method includes one or more steps in which all the data input and selections that have been made until then are stored, to save an at least one partial configuration of the system that is being designed and/or at least one partial composition of the distributors.

As a result, partial or complete configurations of previously designed systems and at least partially composed distributors may be loaded anytime, possibly during new design processes.

This provides the advantage that all previously or currently designed systems may be changed any time.

Furthermore, this also considerably reduces the time required for designing new systems. At the start or during the designing process, at least partial configurations or compositions, stored during past designs of irrigation systems, may be loaded with the certainty that the loaded elements are at least mechanically checked and found to be compatible.

In a further aspect of the invention, the step of selecting elements from the sets may be carried out autonomously by the IT product, based on at least the first and second data and possibly to the third, fourth, fifth and sixth data. Thus, for an even more precise design, such data may also include agricultural data such as water absorption capacity of soil.

In accordance with a particular variant of the invention, the basic design of the irrigation system, i.e. distributor composition, is wholly carried out by the IT product, which greatly facilitates a user's tasks.

Otherwise, in another variant of the invention, the user selects certain elements and leaves the other selections to the IT product, which advantageously allows him/her to impose further restrictions to the designed system.

The above objects and advantages are also achieved by a computer apparatus for optimizing the design and manufacturing of an irrigation system of the type comprising one or more tubing spans, each having a plurality of components, including distributors and elements comprised in said distributors, which comprises:

storage means of a program computer product for designing said irrigation system and comprising a database including multiple possible components of said irrigation system;

loading means, for inputting into said storage means, at least first data concerning said spans and second data concerning the terminals of the last of said spans;

processing means for executing said computer program product to provide a group of sets of elements of said emitters by selecting, among the elements available in said database, those elements having at least mechanical characteristics compatible with said first and second loaded data, to ensure at least the mechanical continuity of said irrigation system during assembly thereof;

selector means for selecting elements from each of said sets, said processing means being designed to reprocess said sets by selecting, among the elements available in said database, those elements having at least mechanical properties compatible with said previously selected elements, to ensure at least mechanical continuity of said irrigation system during assembly thereof;

display means for displaying a list of components comprising at least said selected elements.

BRIEF DESCRIPTION OF THE DRAWINGS

Further features and advantages of the invention will be more apparent from the detailed description of a few preferred, non-exclusive embodiments of a method for optimizing the design of an irrigation system according to the invention, which are described as non-limiting examples with the help of the annexed drawings, in which.

DETAILED DESCRIPTION OF A PREFERRED EMBODIMENT

The method of the invention is adapted to be implemented by a computer apparatus, also within the scope of the invention, for optimized design of an irrigation system I.

Figure 4:
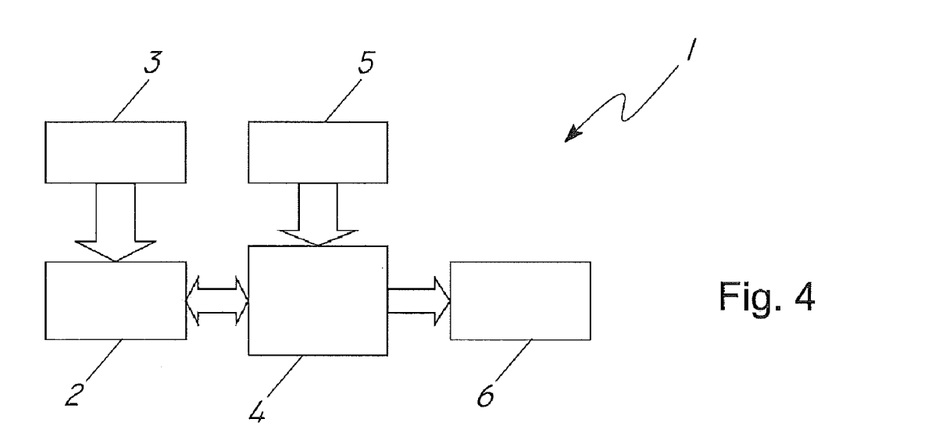
FIG. 4 shows a block diagram of the optimized design apparatus of the invention.

According to the invention, such device, schematically shown in FIG. 4, where it is generally designated by numeral 1, comprises:

storage means 2 of an IT product for the design of the irrigation system I, comprising a database that contains multiple possible components of such irrigation system I;

loading means 3 for inputting first data concerning the spans C and second data concerning the terminals of the last of the spans C into the storage means 2;

processing means 4, which execute said IT product to compose a group of sets of elements E of the distributors G by selecting, among all the elements E of said database, those having at least the mechanical characteristics compatible with the first and second input data, to ensure the mechanical continuity of the irrigation system I during the assembly;

selector means 5 for selecting elements E from each of the above mentioned sets, upon whose operation the processing means 4 reprocess said sets by selecting, among the elements E of said database, those having mechanical characteristics that are also compatible with the elements E selected before among one or more of such sets, to ensure said mechanical continuity;

display means 6 for displaying a list of components for the designed irrigation system I, comprising the selected elements E.

According to one embodiment, the processing means 4 consist of a computer whose internal storage forms the storage means 2. The IT product installed therein comprises portions of software code adapted to implement the method of the invention when the IT product is executed by the computer.

According to a further embodiment, the processing means 4 particularly consists of a central server for access by multiple users, Such access generally occurs through peripheral computers connected to the server, for instance, via the Internet.

This configuration provides the advantage that, since the central server is generally available to a service provider, the database can be easily updated. If the IT product were loaded in a computer owned by a final user, the database would have to be updated by the user, generally by using update IT products in mass storage devices such as compact disks or floppy disks provided by the service provider.

While this procedure is feasible, it still would be an additional task for the final user, and would not allow real-time, but only periodic updating.

The above shall not be intended to exclude different embodiments of the invention in which the processing means consist of a general computer owned by the final user with the above mentioned IT product installed therein or in which the processing means consist of a computer specially designed for optimized design of irrigation systems.

Concerning the storage means 2, these generally consist of one or more hard disks and one or more RAM memory banks.

On the other hand, the loading means 3 generally consist of a keyboard and a mouse, although this shall not be intended to exclude different embodiments, in which the input means are a touch screen, a network connection, one or more floppy disks, CD-ROM or DVD-ROM drives, one or more hard disks, or other similar devices. The display means 6 generally consist of one or more screens and/or one or more printers, whereas the selector means 5 consist preferably, but without limitation, of a keyboard and/or a mouse.

According to a variant embodiment of the invention, the method comprises one or more steps in which all the data inputs and selections that have been made until then are stored, to save an at least partial configuration of the system that is being designed and/or an at least partial composition of the distributors.

This particularly allows partial or complete configurations of previously designed systems and at least partially composed distributors to be loaded anytime, possibly during new design processes.

This obviously provides the advantage that all previously or currently designed systems may be changed any time.

Furthermore, the time required for designing new systems is greatly reduced. At the start or during the design process, at least partial configurations or compositions, stored during past designs of irrigation system, may be loaded with the certainty that the loaded elements are at least mechanically checked and found to be compatible.

According to a further variant embodiment, the step of selecting elements from the sets may be carried out autonomously by the IT product and based on at least the first and second data. Further restriction would be obviously applied to such automatic selection by having it also rely on other third, fourth, fifth and sixth data.

Thus, in accordance with another variant embodiment of the invention, the basic design of the irrigation system, i.e. distributor composition, is wholly carried out by the IT product, which greatly facilitates user's tasks. The input data may also contain additional information, such as agricultural data.

Then, once the desired data has been input, the IT product can make all required selections autonomously.

Nonetheless, the user may be still allowed to select certain elements and leave the other selections to the IT product, which advantageously allows him/her to impose further restrictions to the designed system.

In operation, the user that is charged with the design of the irrigation system I runs the IT product installed in the storage means 2 of the computer apparatus 1 for implementing the inventive method. If the IT product is installed in a central server, the run control is generated by the user by logging into the server with a user name and a password.

Figure 5:
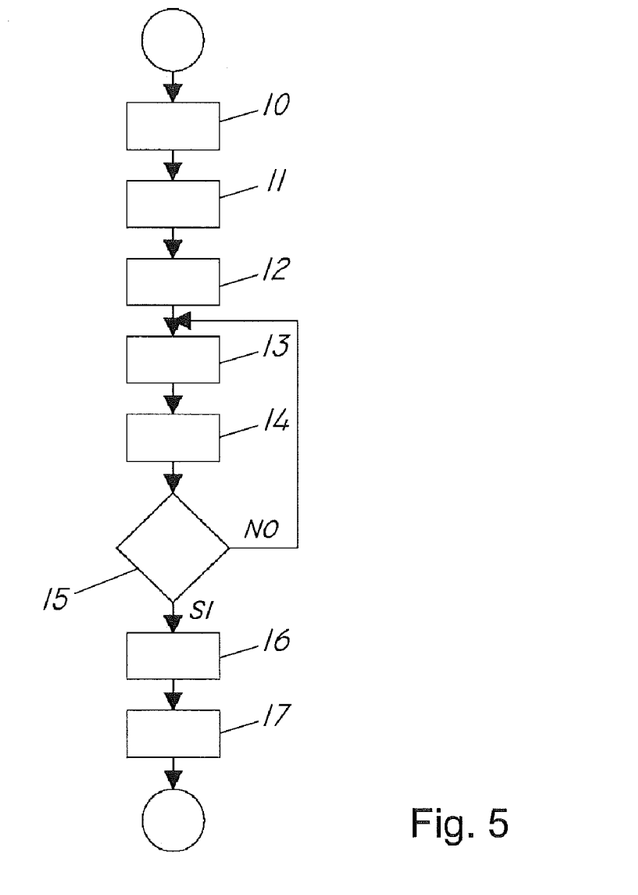
FIG. 5 shows a block diagram of the optimized design method of the invention.

The operation of the IT product will be now illustrated, i.e. the method of the invention will be described with reference to the block diagram of FIG. 5.

Here, two blocks shall be deemed as implicitly present, but not limiting the scope of the present patent. These blocks are the block 10, i.e. providing the IT product comprising a database of all possible commercially available components for composing an irrigation system I, and the block 11, i.e. installing the IT product in the storage means 2 of the computer apparatus 1.

As the IT product is being run by the computer apparatus 1, the user inputs first data concerning the spans C and second data concerning the terminals of the last span C loading them into the storage means 2, using the input means 3. These input steps are indicated by the block 12.

The next block 13 indicates processing, by the processing means 4, of a group of sets of elements E by selecting them among all the elements E of the database based, as mentioned above, on at least the first and second input data.

Particularly, the processing means 4 generate a set for each type of elements E and the selection of the elements E of each set is made in view of their being at least mechanical compatible with the first and second previously input data.

Then, at block 14, the user selects the distributor elements E, one by one, from these sets, using the selector means 5. At the end of each selection, and before any new one, the processing means 4 reprocess the remaining sets in which no selection has been made yet to ensure that the elements E contained therein are also mechanically compatible with the previously selected elements E.

Such processing of the selectable sets of elements E advantageously avoids any selection of mechanically incompatible elements E. In other words, any selection errors made by a user could not prevent assembly of the irrigation system I.

It shall be further noted that this advantageously allows proper design of the irrigation system I by a general user, and not necessarily by a skilled technician. This is because each component and/or element in the database has its respective technical and hydraulic characteristics associated therewith.

Also, this speed up the design process for any user, because it ensures that any selection made cannot affect the mechanical continuity of the resulting system.

Once all selections have been made, at block 16 the IT product can preferably check, but without limitation, whether all the nozzles have been selected. This is because the user may leave the task of selecting all or at least some of the nozzles to the IT product. Nozzle selection is made by the IT product based on nozzle diameter, for proper water sprinkling over the underlying soil. Thus, the method includes a step, not mentioned above because it does not limit the invention, of inputting third data concerning the amount of available water and fourth data concerning water pressure in one or more locations of the irrigation system I, such as the point of water inflow into the system or the end point of the last span C. This step generally precedes the step of first data input which, for the main purpose, contains the hydraulic characteristics of the components and elements E of the system I.

According to a preferred embodiment of the invention, the processing means 4 may also run a computation subprogram of the IT product, which computes water distribution coefficients over the crops.

As a result of such computation, the user can change any previous data input and selection to obtain the desired results and ensure that the system I so designed provides sufficient water distribution.

At the end of the process, the IT product controls, at block 17, transmits the list of the components indicated for the irrigation system I, and particularly the selected elements E, to the display means 6.

According to a further embodiment, processing of the sets of selectable elements may also account for their hydraulic characteristics. Here, a different embodiment of the inventive method may be provided, in which processing of the sets of elements also accounts for their hydraulic compatibility with what has been indicated and selected before during the design process.

For particularly precise computing of distribution coefficients, the database contained in the storage means and available to the IT product also contains the hydraulic parameters of the deflector disks at the end of the distributors. As mentioned above, these parameters are not accounted for in the prior art, and this allows the method of the invention and the computer product for implementing it to reach a higher degree of system design precision than the one achieved by prior art IT products.

According to a further variant embodiment of the invention, the element selection step is preceded by the step of loading sixth data, concerning the desired height from the ground of each of the distributors, into the storage means to adapt the system to crop height.

This step allows the processing means to also advantageously account for said sixth data to compose sets of elements in view of also avoiding this possible error during design.

In one embodiment of the invention, the user selects all the elements E required to compose the distributors G of the system I, but in different embodiments the user only selects some of these elements and leaves the task of selecting the remaining elements to the processing means, appropriately guided by the IT product bring run.

Particularly, according to this variant embodiment, the IT product comprises a special computation subproduct whose execution by the processing means allows the selections to be made.

This advantageously reduces the amount of work to be carried out by the user, while allowing him/her to select the elements believed to be indispensable. As mentioned above, according to another variant embodiment, the task of selecting all the distributor elements is accomplished by the IT product based on input data. Such data includes at least the first and second data, but the user may also input the third, fourth, fifth and/or sixth data for more precise control of the selections made by the IT product. As mentioned above, further data may be also used, such as water absorption capacity of the soil or other agricultural data.

Concerning the first data, it generally includes the number of spans C, the number of possible distributors G to be connected to each span C and else.

Concerning the second data, it generally includes an indication of the presence of a water spray gun connected to the last span C, as well as its hydraulic parameters, i.e. water delivery capacity, an indication of the presence of a booster pump for serving it and an indication of the presence of sand and/or particulate drainage means to prevent it from being clogged.

Concerning the distributors G, as mentioned above they may be composed of a number of elements E. Examples of these elements E, as shown in the exploded view of FIG. 3, are the tubular conduits E1 for guiding water down to the soil, the specially shaped tubular conduits G1, e.g. having a U shape, which connect the distributors G to the spans C, balance weights E2 for ensuring stable vertical positioning thereof, clamps E3 for joining the tubular conduits E1 to connection elements E4, water pressure regulators, nozzles G2.

Due to the above, the method and apparatus of the invention fulfill all the intended objects.

Particularly, they fulfill the object of providing a method for optimizing the design of an irrigation system, providing lower error probability in the selection of system components, particularly in the selection of distributor elements.

They also fulfill the object of allowing such design to be carried out by non expert personnel, while maintaining a minimized error probability in component selection.

They further fulfill the object of speeding up such design while maintaining a minimized error probability in component selection.

Yet, they fulfill the particular object of providing a computer apparatus for optimized design of an irrigation system, providing lower error probability in the selection of system components, so that, in particular, the design process may be also carried out by non expert personnel.

It shall be understood that the method and apparatus of the invention are susceptible of a number of changes and variants in addition to those mentioned above, within the inventive principle as disclosed in the appended claims.

Furthermore, all the details may be replaced by technically equivalent elements or steps, and any size, shape and material may be used according to various needs.

What is claimed is:

1. A method for optimizing a design of a pivot irrigation system, said system comprising a pivot and one or more tubing spans provided with a plurality of components comprising distributors, each of said distributors including one or more elements, the method comprising the following steps:
    providing first data concerning a number of said spans within said pivot irrigation system, a number of possible distributors connectable to each of said spans and one or more hydraulic parameters representative of water transfer rate by said spans, and loading said data into a storage unit of a computer apparatus in which a computer program product is installed for designing said system, said computer program product comprising a database of said components and said elements;
    providing second data concerning indication of a water spray gun, hydraulic parameters representative of a water delivery rate of said spray gun, a presence indicator of one or more of a booster pump, or sand or particular drainage elements within said pivot irrigation system, and loading said second data into said storage unit;
    selecting one or more elements of said distributors from a group of sets of said elements contained in said database loaded in said computer program product; and
    generating at least one partial list of said components including at least said selected elements using said computer program product,
    wherein each of said sets of said group is processed by said computer program product by selecting, among all available elements, those elements having mechanical properties compatible with at least said first and said second input data and said elements, which have been previously selected among one or more of said sets to ensure mechanical continuity of said irrigation system during assembly thereof, and
    wherein said second data further comprise data concerning terminals of the last of said spans such to ensure mechanical continuity of said pivot irrigation system during assembly thereof and proper water sprinkling over crops.

2. The method as claimed in claim 1, wherein before said step of generating said at least one partial list of said components is carried out by said computer program product for selecting one or more nozzles of said irrigation system.

3. The method as claimed in claim 1, wherein said computer program product comprises a computer program product for calculating water distribution coefficients in the irrigation system, to ensure one or more desired hydraulic parameters during operation of said irrigation system.

4. The method as claimed in claim 3, wherein the step of loading said first data is preceded by the following steps:
    loading, into said storage unit, third data concerning an amount of available water; and
    loading, into said storage unit, fourth data concerning water pressure in at least one location of said irrigation system.

5. The method as claimed in claim 4, wherein said fourth data comprise an indication of pressure of said water as measured at an inflow section of said water to said spans, or an indication of pressure of said water as measured at an end section of said last span.

6. The method as claimed in claim 3, wherein said computer program product elaborates fifth data loaded in said computer program product concerning water distribution disks located at ends of said distributors on an opposite side to a side where said distributors are operatively connected to said spans.

7. The method as claimed in claim 3, wherein said selection of said elements of each of said sets is processed by said computer program product among all the available elements having further hydraulic properties compatible with said loaded data and said elements previously selected among one or more of said sets, to provide one or more desired hydraulic parameters.

8. The method as claimed in claim 3, further comprising, after running said computer program product, a step of changing one or more of said loaded data.

9. The method as claimed in claim 1, further comprising, before said step of selecting said elements, a step of loading, into said storage unit, sixth data concerning a desired height from the ground of each of said distributors.

10. The method as claimed in claim 1, further comprising one or more steps of entering into said storage unit of said loaded data and of said selection steps to save one or more of a partial configuration of said irrigation system or a partial composition of one or more of said distributors.

11. The method as claimed in claim 10, wherein said steps of loading data and selecting elements further comprise retrieving, from said storage unit, said previously loaded and saved data and said previously operated and saved selections, to provide said irrigation system with one or more of some partial predetermined configurations or configurations of some partial predetermined distributors.

12. The method as claimed in claim 1, wherein said step of selecting is carried out by said computer program product by selecting elements and components compatible with said loaded data.

13. The method as claimed in claim 1, wherein said computer apparatus is a central computer server configured to be remotely accessed by client computers.

14. The method as claimed in claim 13, wherein access to said central computer server is carried out by an authentication process.

15. The method as claimed in claim 13, wherein said client computers are connected to said central computer server by web access.

16. The method as claimed in claim 1, wherein said elements of said distributors comprise one or more tubular conduits, counterweights, fastening clamps, pressure regulators, or nozzles.

17. The method as claimed in claim 16, wherein at least one of said tubular conduits has a U shape.

18. A non-transitory program computer product loadable in the memory of a computer and comprising software code portions for carrying out the method as claimed in claim 1 when said program computer product is run by a computer.

19. A computer apparatus for optimizing design and manufacturing of a pivot irrigation system of a type comprising a pivot and one or more tubing spans, each having a plurality of components, including distributors and elements comprised in said distributors, the apparatus comprising:

a storage unit of a program computer product for designing said pivot irrigation system, said storage unit being configured to store a database including multiple possible components of said irrigation system;

a loading unit, for inputting into said storage unit, at least first data concerning said a number of said spans and one or more hydraulic parameters representative of water transfer rate by said spans, and second data concerning terminals of the last of said spans and indication of a water spray gun, hydraulic parameters representative of a water delivery rate of said spray gun, a presence indicator of one or more of a booster pump, or sand or particular drainage elements within said pivot irrigation system;

a processing unit for executing said computer program product to provide a group of sets of emitter elements by selecting, among the elements available in said database, those elements having at least mechanical characteristics compatible with said first and second loaded data, to ensure at least mechanical continuity of said irrigation system during assembly thereof;

a selector unit for selecting elements from each of said sets, said processing unit being designed to reprocess said sets by selecting, among the elements available in said database, those elements having at least mechanical properties compatible with said previously selected elements, to ensure at least mechanical continuity of said irrigation system during assembly thereof; and a display unit for displaying a list of components comprising at least said selected elements.

20. The apparatus as claimed in claim 19, wherein said processing unit comprise at least one computer, at least one central computer server, or one or more client computers connectable to said central computer server.

21. The apparatus as claimed in claim 19, wherein said selector unit comprise a computer subprogram product suitable to be run by said processing unit, or one or more loading devices for loading data into said processing unit available to an operator.

* * * * *